Sept. 5, 1939.  I. F. DAVIDSON  2,171,846

TRACTOR AND MEANS FOR GUIDING SAME

Filed April 12, 1937  2 Sheets—Sheet 1

INVENTOR
Isaac F. Davidson
BY *T. J. Geisler*
*and F. R. Geisler*
ATTORNEYS

Sept. 5, 1939.  I. F. DAVIDSON  2,171,846
TRACTOR AND MEANS FOR GUIDING SAME
Filed April 12, 1937  2 Sheets-Sheet 2
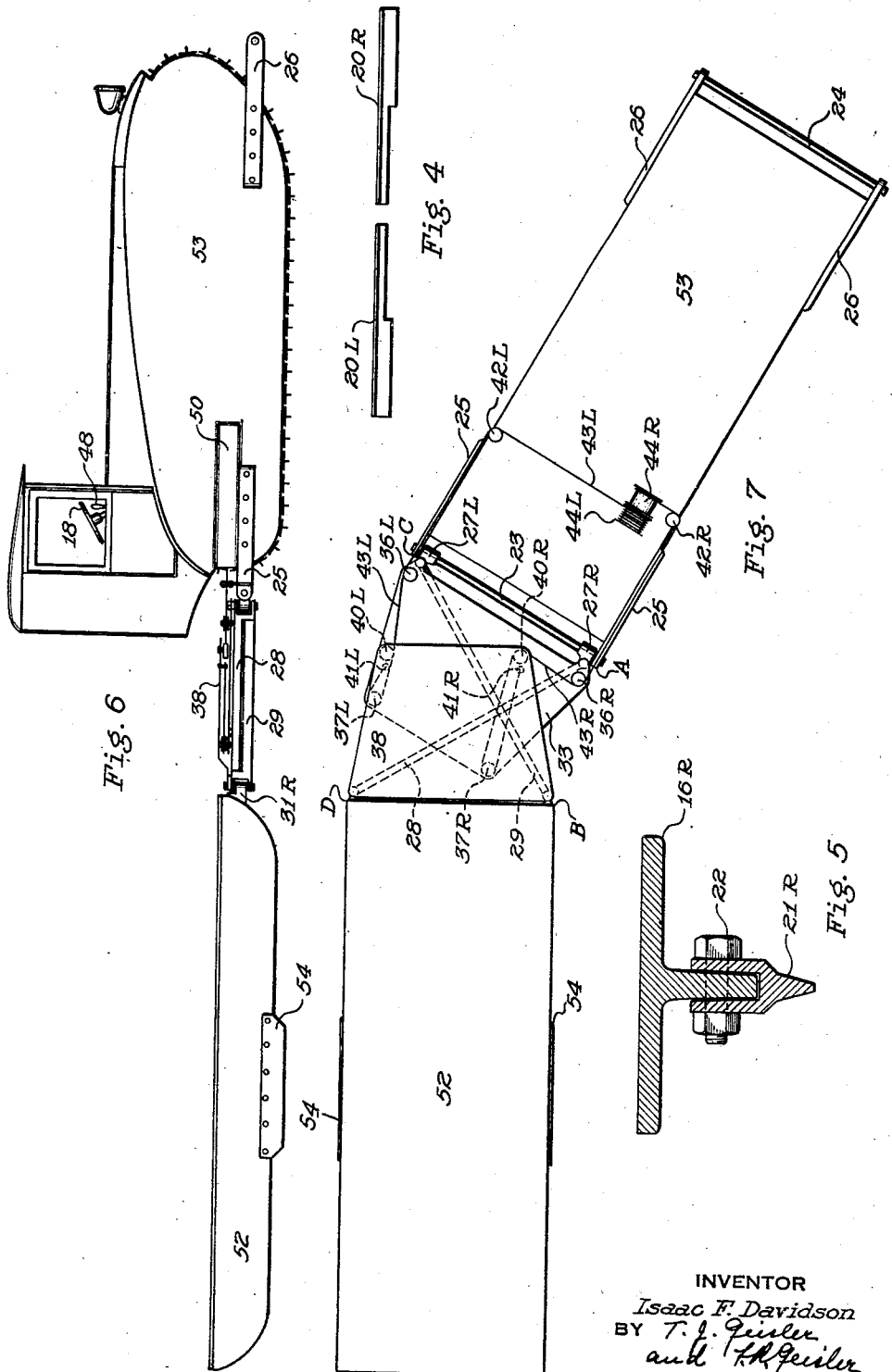
INVENTOR
Isaac F. Davidson
BY T. J. Geisler
and F. R. Geisler
ATTORNEYS Patented Sept. 5, 1939

2,171,846

UNITED STATES PATENT OFFICE 2,171,846

TRACTOR AND MEANS FOR GUIDING SAME

Isaac F. Davidson, Portland, Oreg.

Application April 12, 1937, Serial No. 136,426

5 Claims. (Cl. 180—9.1)

My invention relates to tractors of the "caterpillar" or endless traction belt type having two endless track belts, one on either side.

The chief object of my invention is to provide an improved tractor which may be used with equal efficiency on roads, rough ground, or in deep snow.

Referring to the accompanying drawings, forming a part of this specification:

Fig. 4 illustrates another method of fabricating the track members of the tractor, these track members corresponding to those appearing on the tractor illustrated in Figs. 1 and 6;

Fig. 5 is a transverse sectional view taken on the lines 5—5 of Fig. 5, drawn to a larger scale and illustrating the construction of the track extensions or cleats of Fig. 3;

Fig. 6 is a side elevational view, drawn on a smaller scale, of my tractor with a trailer vehicle and connecting hitch;

Fig. 7 is a diagrammatic plan view drawn to the same scale as Fig. 6 and illustrating an auxiliary method of steering my tractor.

Figure 2:
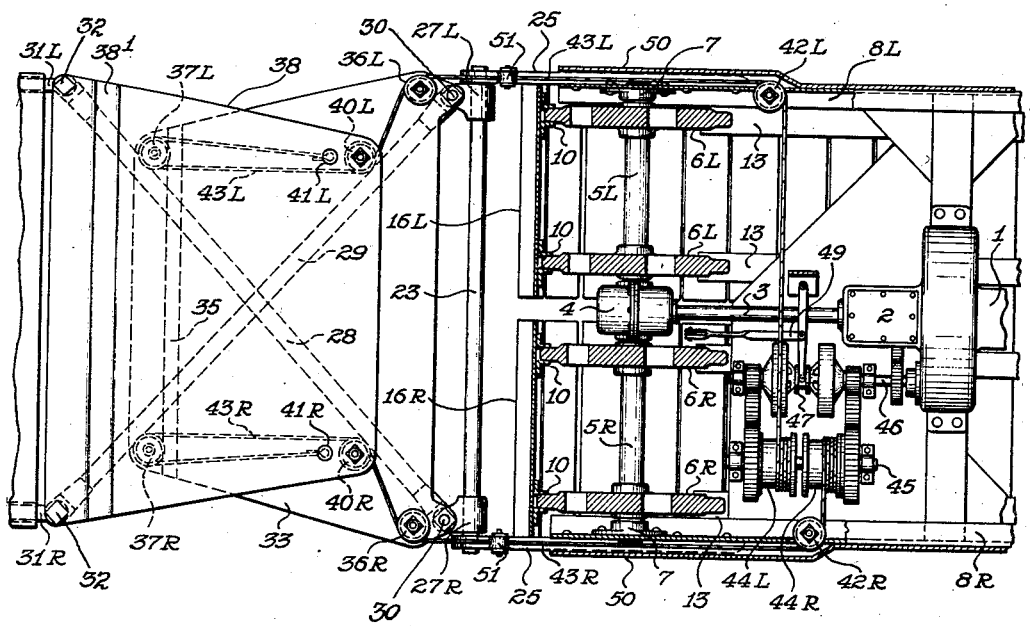
Fig. 2 is a plan view of the portion of my device shown in Fig. 1, but with part in horizontal section, such section being taken on the line 2—2 of Fig. 1.

The driving mechanism of the tractor shown in Figs. 1, 2, 6 and 7 may include the usual internal combustion engine, indicated in part in Fig. 2 by the reference character 1, and associated therewith the usual transmission, indicated at 2, drive shaft 3 and differential mechanism 4. Thru this means rotary driving motion is imparted to the stub axle shafts 5L and 5R and to their attached pairs of track-driving sprocket wheels 6L and 6R, the outer ends of the axle shafts 5L and 5R being journaled in suitable bearings 7 secured to the side chassis members 8L and 8R of the tractor.

The driving sprocket wheels 6L and 6R cooperate with endless chain belts 9 (see Fig. 1) which may be of the well-known detachable-link type comprising links 10 of angular form (see Fig. 3) fitted with rollers 11. These endless chains 9 are carried at the forward end of the tractor by sprocket wheels (not shown) similar to the driving sprocket wheels 6L and 6R at the rear, but mounted on idling shafts, as is customary in tractors of this type. Between the driving sprockets 6L and 6R at the rear and the idling sprockets at the forward end of the tractor, the chain belts 9 pass over lower and upper guide rails 13 and 14 (see Figs. 1 and 3), these guide rails being mounted on transverse members 12 extending across the chassis structure. Alternate links in the endless chains 9 may be fabricated with extending plates 15 which coact with the sides of the guide rails 13 and 14 and thus constitute a means for preventing lateral displacement of the chain belts between the forward and rear sprocket wheels. The track members 16L and 16R are preferably T-shaped in cross section and are secured to the links 10 of the endless chains 9 by rivets or other suitable means.

Tractors of the "caterpillar" or endless traction belt type are usually steered by devices which exert a braking effect on the movement of either track, the differential mechanism connecting the sprocket drive wheels of the two tracks permitting the unrestrained track to move ahead of the track to which the brake means is applied. Such braking pressure may be applied thru the medium of a hand wheel, for example such as the wheel 18 (see Fig. 1) located in the control cab of the tractor, or may be applied by suitable levers.

Figure 3:
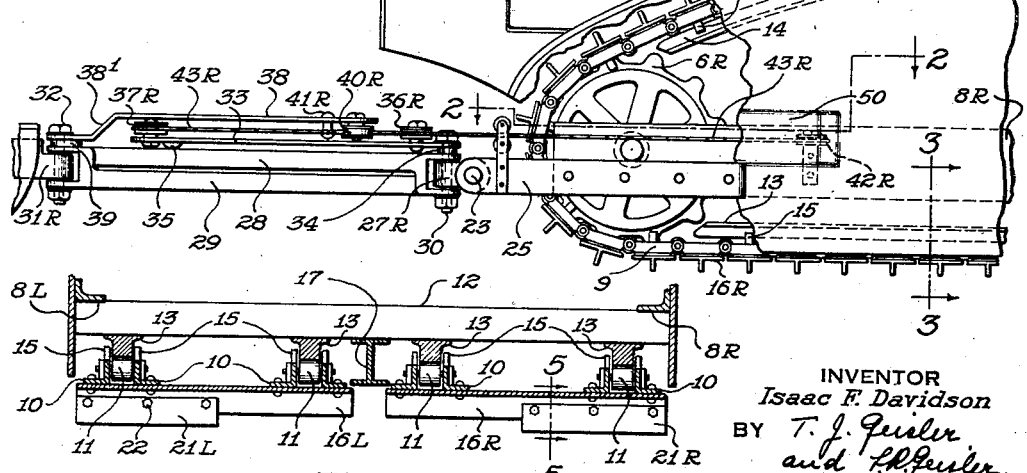
Fig. 3 is a transverse sectional view taken on the line 3—3 of Fig. 1, but drawn to a larger scale than Fig. 1, and illustrating one method of fabricating the track members of the tractor, but showing supplemental track extensions or cleats attached to such track members.

In ordinary "caterpillar" or endless traction belt tractors, the two parallel track belts are comparatively narrow and are located near the lateral sides of the tractor, leaving considerable space in the center between them. The wide separation of the track belts facilitates steering of the ordinary tractor. But ordinary tractors with such widely spaced and comparatively narrow track belts cannot be used in deep snow, since the weight of the tractor, supported on tracks of relatively small area, causes the tracks to sink so far into the snow and causes such a quantity of snow to be packed between the tracks that a considerable portion of the weight of the tractor will rest on the snow packed therebetween making further traction impossible. To overcome this difficulty I make the tractor belts of my tractor very broad, the width of each being equal to nearly half the width of the tractor, thus making the two tractor belts cover nearly the entire bottom space of the tractor with only a narrow space between the tractor belts, as shown in Fig. 3. In the space between the tractor belts a longitudinal I-beam 17 or similarly shaped member is interposed, being secured to the bottom transverse members 12 of the chassis. The placing of the central longitudinal member 17 in this clearance space between the parallel track belts serves to prevent any large fragments of foreign matter from entering into the bottom mechanism, and a similar purpose is accomplished by having the bottom edges of the side sheathing secured to the chassis members 8L and 8R of my tractor terminate close to the outer edges of the tractor belts on each side.

With such broad tractor belts the weight of my tractor is distributed over such broad areas that my tractor will sink only a few inches even in soft snow, and I am able to obtain sufficient traction in soft snow to enable my tractor to pull comparatively heavy loads up mountain inclines. The use of such broad tractor belts, located so close together, however, has a tendency to interfere to some extent with the ordinary steering of the tractor when used on the ground. This will be readily understood since any turning of the tractor forces the tractor members on the bottom 16L and 16R to turn on the ground while supporting the tractor weight. As a result, with broad tractor belts located close together, it would ordinarily be difficult to turn the tractor in sharp curves. I overcome this difficulty, however, by providing shorter extensions 21L and 21R at the outer ends of the track members 16L and 16R (see Figs. 3 and 5). These extensions accomplish the same result, in facilitating the steering of the tractor on the ground, as would be obtained by having tractor belts of width corresponding to the length of the extensions 21L and 21R and placed in their same relative position. Thus, with these extensions my tractor, when used on ordinary ground, can be steered with the same facility as any ordinary caterpillar or endless traction belt type of tractor.

The extensions 21L and 21R may be made in various forms. In Figs. 3 and 5 they are made in the form of supplemental cleats having a forked upper portion which is removably attached to the track member 16L or 16R by bolts 22 extending thru corresponding holes provided. The bottoms of these extensions or cleats 21L and 21R may also be made in various forms, depending upon the nature of the ground on which the tractor is to be used, the wedge-shaped bottom edge shown in Fig. 5 being a type suitable for use on hard ground or on ice. If preferred, however, the extensions may be integral with the track members, and such track members are illustrated by 20L and 20R in Fig. 4. It will be noted that these track members 20L and 20R have portions of their downwardly extending stems or blades at the outer ends made much longer than the remaining portions.

If, when my tractor is used in soft, deep snow, the steering means already described, is insufficient, auxiliary steering means may be supplied in the form of a trailer vehicle or sled attached to the tractor by an adjustable hitch, this hitch operating in the same manner as the hitch described in my United States Letters Patent No. 2,112,559, issued March 28, 1938, which might be substituted for it.

Figure 1:
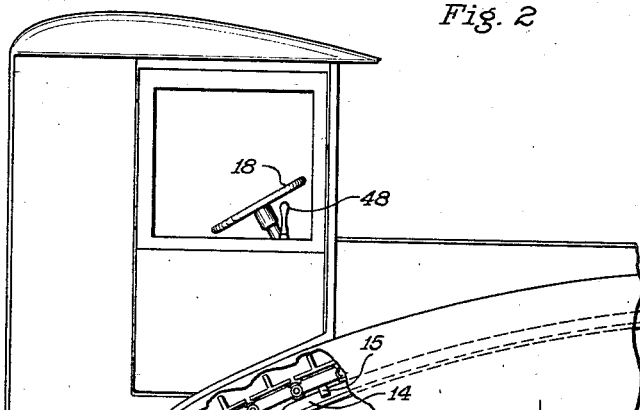
Fig. 1 is a side elevational view of the rear portion of my tractor, showing also hitch connecting the tractor, and a drawn vehicle, a fragment of the outer shield at the side of the tractor structure being broken away to reveal parts of the operating mechanism.

Referring to Figs. 1 and 2, a draw-bar 23 is firmly secured between the pair of bars 25, extending rearwardly from the sides of the tractor chassis. On the opposite ends on the draw-bar 23, the brackets 27L and 27R are rotatably mounted. To each of these brackets is pivotally connected a forked end of one of the crossed coupling rods 28 and 29, the rods being secured by means of bolts 30 permitting the rods to pivot with respect to the brackets 27L and 27R. Thus, this pivotal connection of the rods in conjunction with the rotatable mounting of the brackets, constitutes in effect universal joints. The forked ends of the crossed coupling rods 28 and 29 are offset vertically so that the rods may be crossed and then connected in the same plane to the side draft bars 31L and 31R at the forward end of the vehicle 52 by the bolts 32 (see Fig. 2). Thus, each of the rods 28 and 29 is connected to the rear of the tractor at one side and to the forward end of the drawn vehicle 52 at the opposite side. The coupling rods 28 and 29 are not joined at their intersection and are therefore free to pivot horizontally.

A pair of pulley-supporting deck plates 33 and 38 are arranged above the cross coupling rods 28 and 29, the lower plate 33 being secured to the bolts 30 on the brackets 27L and 27R at the rear of the tractor, and the upper plate 38 being secured to the bolts 32 at the forward end of the vehicle 52. Interposed spacer bushings 34 and 39 on the bolts 30 and 32, respectively, permit free movement of the cross rods 28, 29, and a half round transverse bar 35 attached to the bottom of the lower plate 33, also permits the cross rods to move freely beneath the lower plate. The plates 33 and 38 are preferably trapezoidal in shape, as shown in Figs. 2 and 7, so that when the tractor 53 and rear vehicle 52 are turned with respect to each other, as illustrated in Fig. 7, there will be no objectional projecting corners of the plates.

On the lower plate 33 two pairs of pulleys 36L, 36R and 37L, 37R are rotatably mounted on suitable bearing pins securely disposed in the plate 33 and located in the positions indicated in Fig. 2. A pair of pulleys 40L and 40R are similarly rotatably mounted under the upper plate 38 in the position shown in Fig. 2, and cable anchors 41L and 41R are firmly secured to the upper plate 38. The upper plate 38 is bent downwardly at 38' to provide suitable clearance between these two plates with the pulleys and anchors mounted thereon as mentioned.

The operation of the auxiliary steering mechanism and the manner in which the connecting hitch between the tractor and the rear vehicle functions will now be described with reference to Figs. 1, 2 and 7.

On suitable brackets, attached to the side chassis members 8L and 8R of the tractor, are rotatably mounted the pulleys 42L and 42R, respectively. On the lower plate 33, the pulleys 36L and 36R are preferably placed in longitudinal alinement with the tractor pulleys 42L and 42R, respectively. A pair of cables 43L and 43R, having their ends secured to the anchors 41L and 41R, respectively, pass around the pulleys 37L, 40L, 36L and 42L and 37R, 40R, 36R and 42R, respectively, and are wound on the drums 44L and 44R, respectively. The drums 44L and 44R are rotatably mounted on a common idling shaft 45 disposed in suitable bearings secured to the chassis structure, and these drums are driven individually by means of friction clutches and suitable gears from a drive shaft 46 which in turn receives rotary motion from the transmission mechanism 2 of the tractor. The friction clutch assembly, which may be of the usual type, having a sliding collar 47 connected by suitable linkage 49, is operated by a control lever 48 located in the cab of the tractor (see Fig. 1). Any form of brake mechanism (not shown) may be incorporated to prevent free rotation of the cable drums 44L, 44R when the drum clutch assembly is in neutral position, and also to prevent too rapid rotation of the free idling drum when the drum clutch mechanism is set to drive the other drum. The location of the pulleys 42L and 42R and 36L and 36R is such that the cables 43L and 43R are parallel to, but outside of the chassis members 8L and 8R. The outer shell or sheeting material which is used to cover the entire sides of the tractor is pressed outwardly as at 50 to provide a protective covering and passage for the cables. Guide rollers 51 which are rotatably mounted in brackets secured to the side bars 25, serve to hold the cables parallel to the side bars 25 and level with the pulleys 42L and 42R regardless of the varying relative elevation of the pulleys 36L and 36R when the tractor and trailer are passing over rough surfaces.

Referring now to Fig. 7, it is obvious that if the corners A and B of the tractor and trailer, respectively, are drawn closer together, while the corners C and D are spread further apart, the tractor and trailer vehicle will be turned with respect to each other. Such turning is accomplished simply by causing one of the cables, for example cable 43L as shown in Fig. 7, to be wound on its drum in the tractor while allowing the other cable to be unwound. Thus, referring to Fig. 7, the cable 43L, passing around the guide pulleys 36L and 40L draws the pulley 37L attached to the lower plate 33, closer to the anchor 41L attached to the top plate 38, and this action causes the cross coupling rods 28 and 29 to pivot and assume the positions shown in Fig. 7.

The trailer vehicle or sled 52, being of the same width as the tractor 53, travels in the path or rut made by the tractor. The sides of the sled, being forced into contact with the edges of the rut, resist any attempt to shove the sled sideways and enable the sled, acting in this way as a rudder, to force the tractor in front of the sled to turn when desired. For the purpose of enabling another tractor to be coupled ahead of the tractor a draw bar 24 is provided between side bars 26, such draw bar being similar and located at the same height from the ground as the draw bar 23 at the rear of the tractor.

Obviously, many variations may be made in the mechanism and other details of my tractor without departing from the principles of my invention. It is not my intention to limit myself to any particular construction other than to provide broad endless tracks and traction means substantially as claimed.

I claim:

1. A tractor of the "caterpillar" type having a pair of endless track belts, the width of each track belt being equal approximately to half the width of said tractor, said track belts having cleat-like blades extending from the traction surface of said belts, said blades being wider at the outer edges of said belts than at the inner edges of said belts, whereby to facilitate the steering of said tractor.

2. A tractor of the "caterpillar" type having a pair of endless track belts, the width of each track belt being equal approximately to half the width of said tractor, said track belts having transverse members with cleat-like blades extending from the traction surface of said belts, said blades being wider at one end than at the other, the wide portions of said blades being located adjacent the outside edges of said belts, whereby to facilitate the steering of said tractor.

3. A tractor of the "caterpillar" type having a pair of endless track belts, the width of each track belt being equal approximately to half the width of said tractor, cleat-like blades on the traction surface of said belts, and extension cleats attached to said blades adjacent the outside edges of said belts and extending only part way transversely across said belts, whereby to facilitate the steering of said tractor.

4. In a tractor of the "caterpillar" type, a pair of endless track belts, each being of approximately half the width of the tractor, said track belts having cleat-like blades extending from the traction surface of said belts, said blades being wider at the outer edges of said belts than at the inner edges of said belts.

5. In a tractor of the "caterpillar" type a pair of endless track belts, the width of each track belt being equal approximately to half the width of said tractor, said track belts having transverse members with cleat-like blades on the traction surface of said belts, and extension cleats attached to said blades adjacent the outside edges of said belts, said extension cleats being of shorter length than said transverse members so as to extend only part way across said track belts.

ISAAC F. DAVIDSON.